US006824106B2

(12) United States Patent
Douglas et al.

(10) Patent No.: US 6,824,106 B2
(45) Date of Patent: Nov. 30, 2004

(54) INTEGRATED PARACHUTE HARNESS SYSTEM

(75) Inventors: David Jay Douglas, Leicester, NC (US); Gary Edward King, Jr., Fletcher, NC (US); Mark Alexander Trexler, Arden, NC (US); Randy Tritt, Asheville, NC (US)

(73) Assignee: Simula, Inc., Tempe, AZ (US)

( * ) Notice: Subject to any disclaimer, the term of this patent is extended or adjusted under 35 U.S.C. 154(b) by 0 days.

(21) Appl. No.: 10/105,444

(22) Filed: Mar. 26, 2002

(65) Prior Publication Data

US 2003/0146348 A1 Aug. 7, 2003

Related U.S. Application Data

(60) Provisional application No. 60/297,752, filed on Jun. 14, 2001.

(51) Int. Cl.$^7$ ............................................... B64D 17/30
(52) U.S. Cl. .................................................. 244/151 R
(58) Field of Search ...................... 244/151 R; 182/3–7; 119/96; 2/102; 441/106, 117, 118

(56) References Cited

U.S. PATENT DOCUMENTS

| | | | |
|---|---|---|---|
| 2,114,310 A | | 4/1938 | McCarroll |
| 2,382,816 A | * | 8/1945 | Quilter et al. ........... 244/151 R |
| 3,258,231 A | * | 6/1966 | Basnett .................... 244/151 R |
| 3,362,034 A | * | 1/1968 | Oldham ................... 244/115 R |
| 3,475,774 A | * | 11/1969 | Hawkins ................. 244/151 R |
| 3,634,889 A | * | 1/1972 | Rolsten ........................... 2/2.5 |
| 3,672,609 A | | 6/1972 | Hawkins |
| 3,737,126 A | * | 6/1973 | Martin .................... 244/151 R |
| 3,843,969 A | | 10/1974 | George et al. |
| 3,957,231 A | | 5/1976 | Miller et al. |
| 4,512,437 A | | 4/1985 | Savage |
| 5,220,976 A | | 6/1993 | Gunter |
| 5,277,348 A | | 1/1994 | Reid |
| 6,108,816 A | * | 8/2000 | Bradley ......................... 2/102 |
| 6,233,740 B1 | | 5/2001 | Bradley |

FOREIGN PATENT DOCUMENTS

WO    PCT/US02/16465    2/2002

OTHER PUBLICATIONS

Butler Personnel Parachutes: The Emergency Parachute Experts (9 pages) www.butlerparachutes.com/.
Life Support International: Integrated Chest Style Para/Raft Survival System(3 pages) www.lifesupportintl.com.
Life Support International: Mini Hawk Parachute (2 pages) www.lifesupportintl.com/minihawk.htm.
Strong Enterprises: Airborne Piggyback System (APS) (2 pages) www.strongparachutes.com/aps.html.
US Army Soldier Systems Center (4 pages).
"T–21" Parachute for the 21st Century (12 pages) www.geocities.com/Pentagon/5265/T–21.htm.
Parachutes Australia: Telesis S026–A Parachute Assembly (7 pages) www.parachutesaustralia.com/s2/prod_mil_s026a.php.
Flighthelmet.com: Ejection Seat Torso Harnesses & Fittings (3 pages) www.check6aviation.com/info/koch.htm.
"Air force Technical Order," Figures 13–1; 18–1; 19–1; 19–3 and 19–7.

* cited by examiner

Primary Examiner—Galen Barefoot
(74) Attorney, Agent, or Firm—Shaw Pittman LLP

(57) ABSTRACT

The disclosed integrated parachute harness system has multiple points of resistance, thereby securing a wearer in three directions. The system further relates to an integrated system including a parachute harness, a survival vest and a flotation collar.

23 Claims, 3 Drawing Sheets

INTEGRATED PARACHUTE HARNESS SYSTEM

This application claims the benefit of U.S. Provisional Application No. 60/297,752 filed Jun. 14, 2001, which is incorporated by reference herein in its entirety.

BACKGROUND

1. Field of the Invention

The integrated parachute harness system of the present invention relates to an integrated parachute harness system having multiple restraint assemblies.

2. Background of the Invention

Aircrews are required to wear multiple devices when performing their missions. Typically, these devices include a vest, a parachute harness, and at least one parachute. Each of these devices is very bulky. When configured on a wearer, they restrict the movement of crewmembers when they are performing their jobs. Also, donning and doffing multiple devices that require multiple harnesses is time consuming.

Furthermore, existing parachute harness systems are not comfortable to wear. Typically, a crewmember must make multiple adjustments to maximize comfort and mobility. As will be appreciated by those skilled in the art, the opportunity for making errors is increased if a crewmember must don and doff multiple devices. Another problem of current devices is that the crewmembers must wear is that they typically require extensive adjustments of straps, buckles, and other attachment devices, and often the loads are not properly distributed on the crewmembers. Finally, conventional parachute harnesses do not effectively integrate lifesaving device systems and are expensive to maintain.

Accordingly, a need exists for a parachute harness system that integrates the individual devices that crewmembers must wear into an ensemble that allows crew members to move freely and perform their jobs. A further need exists for a parachute harness system that integrates the lifesaving device systems crewmembers must wear, while being relatively easy to don, doff and adjust for comfort in a relatively short amount of time.

SUMMARY OF THE INVENTION

The integrated parachute harness system according to this invention provides many advantages. For example, the system has multiple restraints that provide multiple points of resistance to a wearer. In other words, the harness system has multiple restraints that secure onto a wearer's body at different angles and positions. This promotes a snug fit of the harness system onto the wearer and prevents the wearer from being separated from the harness system, such as during an airplane jump. Furthermore, the harness system according to the invention is fully adjustable such that the multiple restraints are adjusted to a wearer's body, thereby securing the harness system to a particular wearer's bodily dimensions. Furthermore, the harness system has multiple removable components that can be secured onto the system if a wearer desires such components. These components include, but are not limited to, parachutes, life vests, and flotation collars.

An exemplary embodiment of the invention is an integrated parachute harness assembly.

The assembly includes a first set of restraints that wraps around a wearer's chest area in an upward manner, a second set of restraints that is connected to the first set of restraints and spans across the wearer's back area, and a third set of restraints that is connected to the first set of restraints and spans across the wearer's waist area in a horizontal manner. This configuration aids in securing a wearer firmly to the assembly.

The integrated parachute harness system of the present invention includes a quick donning/doffing parachute harness, which preferably includes two adjustable quick-release leg straps, two adjustable torso straps, and two adjustable diagonal straps, which may be adjusted for comfort and to fit any anthropomorphic profile. The integrated parachute harness system also includes a low-profile survival vest comprising at least two large side-pockets, a main lift webbing, and at least four back adjustments. The survival vest can be configured to support a military survival gear such as, for example, a HEEDs bottle. Preferably, the integrated parachute harness system of the present invention also includes a low-profile flotation collar.

An exemplary embodiment of the invention is an integrated parachute assembly. The assembly includes a parachute harness assembly which has an adjustable parachute harness with two main adjustable straps that crisscross on a wearer's back and at least two adjustable leg straps, wherein the main straps attach to the at least two adjustable leg straps at main joints thereof. The assembly further includes an adjustable survival vest, wherein the vest is adjustably attached to the parachute harness, and a flotation collar device, wherein the flotation collar is fixedly attached to the parachute harness assembly.

Another exemplary embodiment of the invention is an integrated parachute assembly. The assembly includes a parachute harness assembly comprising an adjustable parachute harness that includes at least two main adjustable straps that run down a wearer's back and connect to at least two adjustable leg straps, a vest ensemble attached to said harness, wherein the vest ensemble includes at least two adjustable, removable pockets, a flotation collar device that is removably attached to the parachute harness assembly, and at least one parachute attached to the main straps at a front portion of the wearer.

Yet another exemplary embodiment of the invention is an integrated parachute assembly. The assembly includes a parachute harness assembly comprising an adjustable parachute harness that includes at least two main adjustable straps that cross on a wearer's back and means for attaching adjustable leg straps to the harness, an adjustable vest ensemble with means for attaching a plurality of items to at least two adjustable pockets, a flotation collar device, attached to the parachute harness assembly, wherein the harness assembly further includes means for adjusting the assembly to fit nearly any anthropomorphic profile, and means for attaching the vest to the harness.

Another exemplary embodiment of the invention is an integrated harness device. The device includes a parachute harness assembly comprising an adjustable parachute harness that has first and second adjustable straps that travel from a common point at the upper middle of a wearer's back and run down and across a wearer's back to connect to two webbing joints. The first and second straps also run up and over the shoulders of the wearer, down the wearer's chest, and connect to two adjustable leg straps, and further wherein the first and second adjustable straps include at least four buckles for adjusting the straps at the front and back of the wearer. The device further includes at least two adjustable leg straps, which include adjustable buckles and ejector snaps, wherein the leg straps are adjustable to fit the wearer and may be quickly released, a vest ensemble attached to said harness, wherein the vest ensemble includes at least two adjustable, removable pockets, a flotation collar device that is removably attached to the parachute harness assembly, and at least one parachute attached to the harness straps at front portion of the wearer, wherein the harness assembly includes connections for an auxiliary parachute.

In yet another exemplary embodiment, the invention is an integrated parachute harness assembly. The assembly includes an adjustable parachute harness that includes two main adjustable straps that crisscross on a wearer's back, at least two adjustable leg straps, and adjusters for adjusting the straps, wherein the main straps attach to the at least two adjustable leg straps at main joints thereof. The assembly further includes a connector for accommodating an adjustable vest ensemble, a connector for accommodating a flotation collar device, and a connector for accommodating at least one parachute attached to the harness straps at a front portion of the wearer.

Another exemplary embodiment of the invention is an integrated parachute harness assembly. The assembly includes an adjustable parachute harness that has adjustable straps that crisscross on a wearer's back, vertical adjustable straps that can accommodate connectors attached to a parachute, and horizontal straps that partially extend across the wearer's torso, wherein the three straps function together to secure the wearer such that the wearer is removably secured to the parachute harness. The assembly also includes a connector for accommodating at least one parachute attached to the vertical straps at a front portion of the wearer.

DETAILED DESCRIPTION OF THE INVENTION

Figure 1:
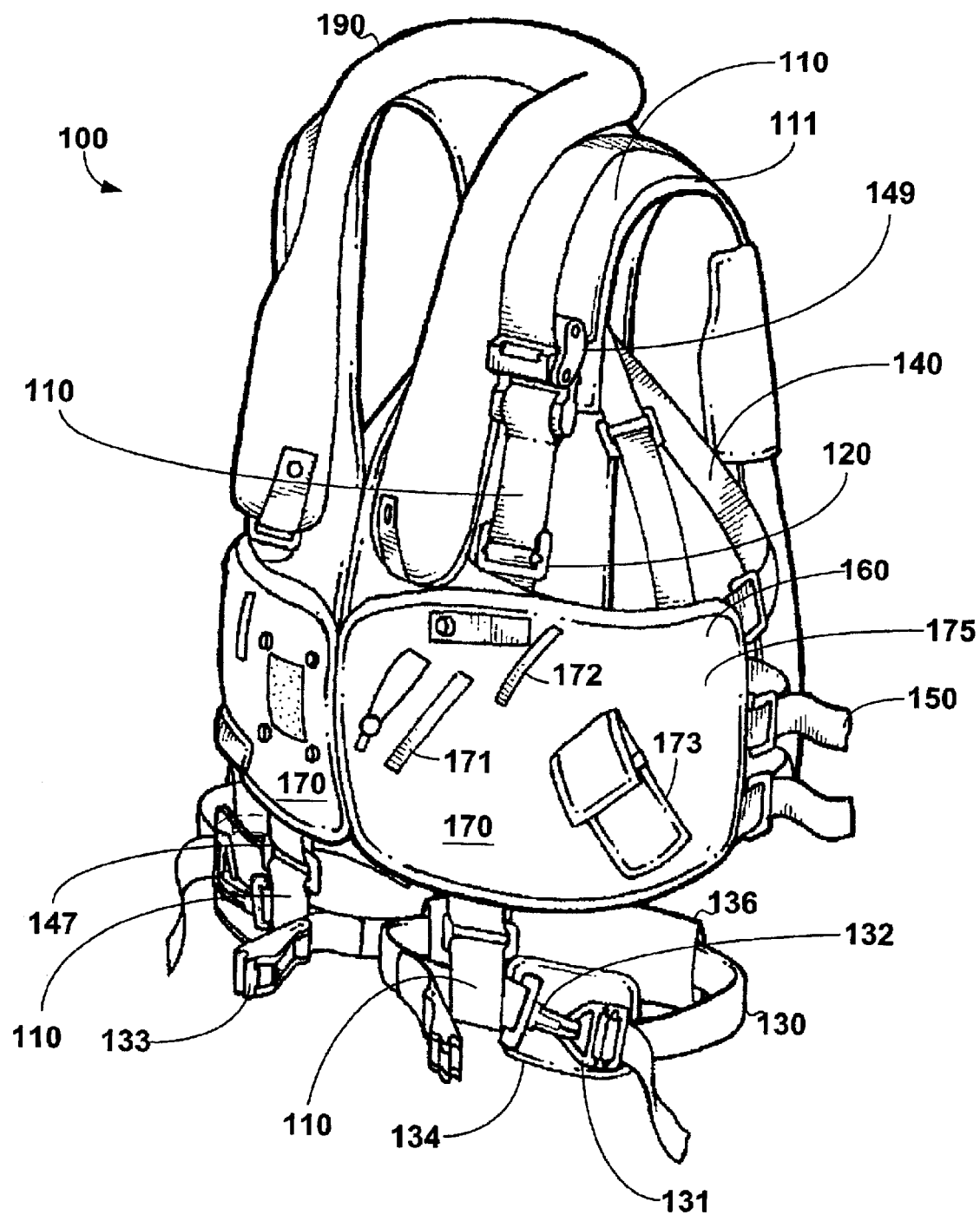
FIG. 1 is a frontal perspective view of an exemplary embodiment of an integrated parachute harness ensemble in accordance with the present invention.
Figure 2:
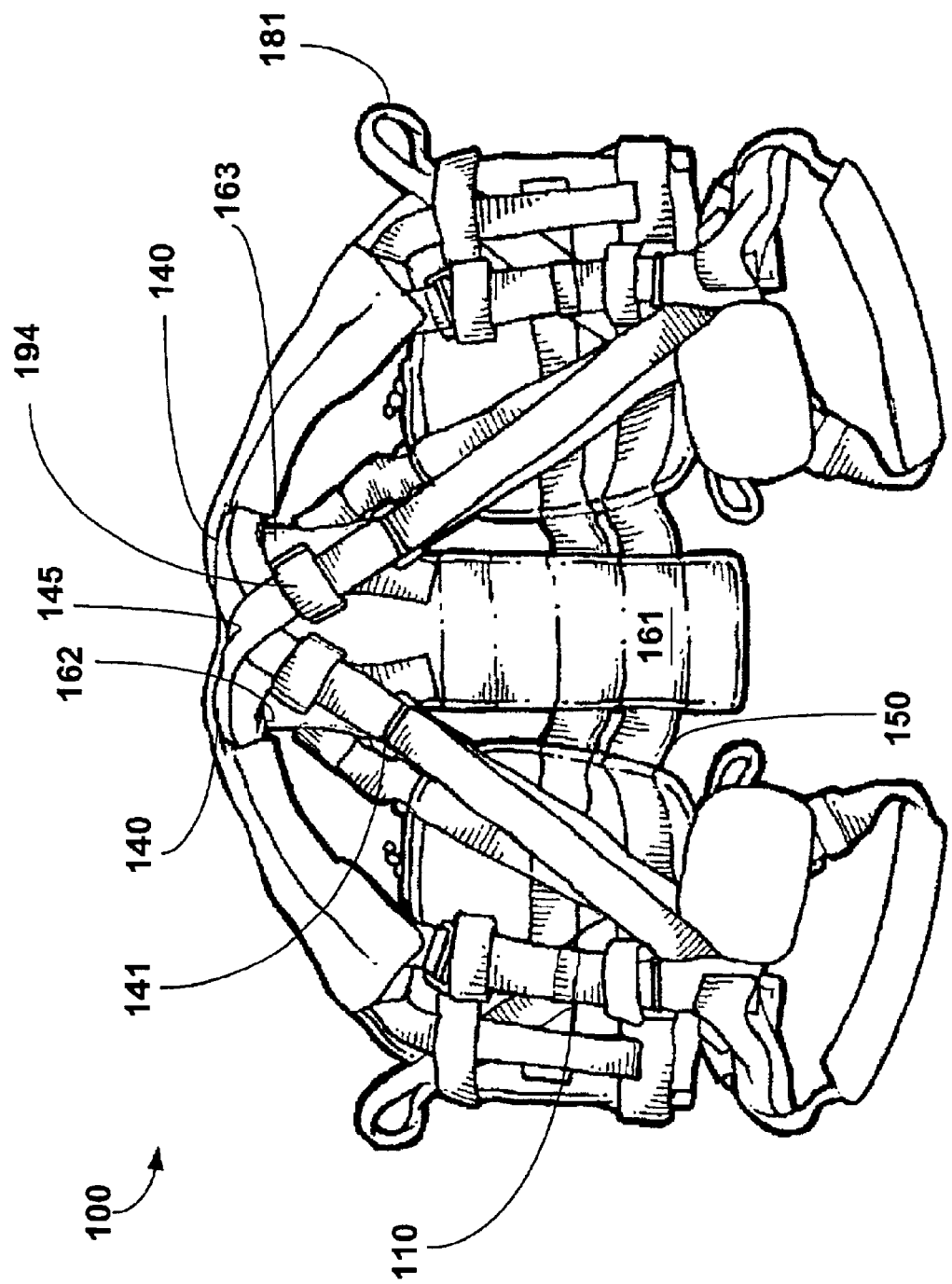
FIG. 2 is a front-internal view of an exemplary embodiment of an integrated parachute harness ensemble in accordance with the present invention.
Figure 3:
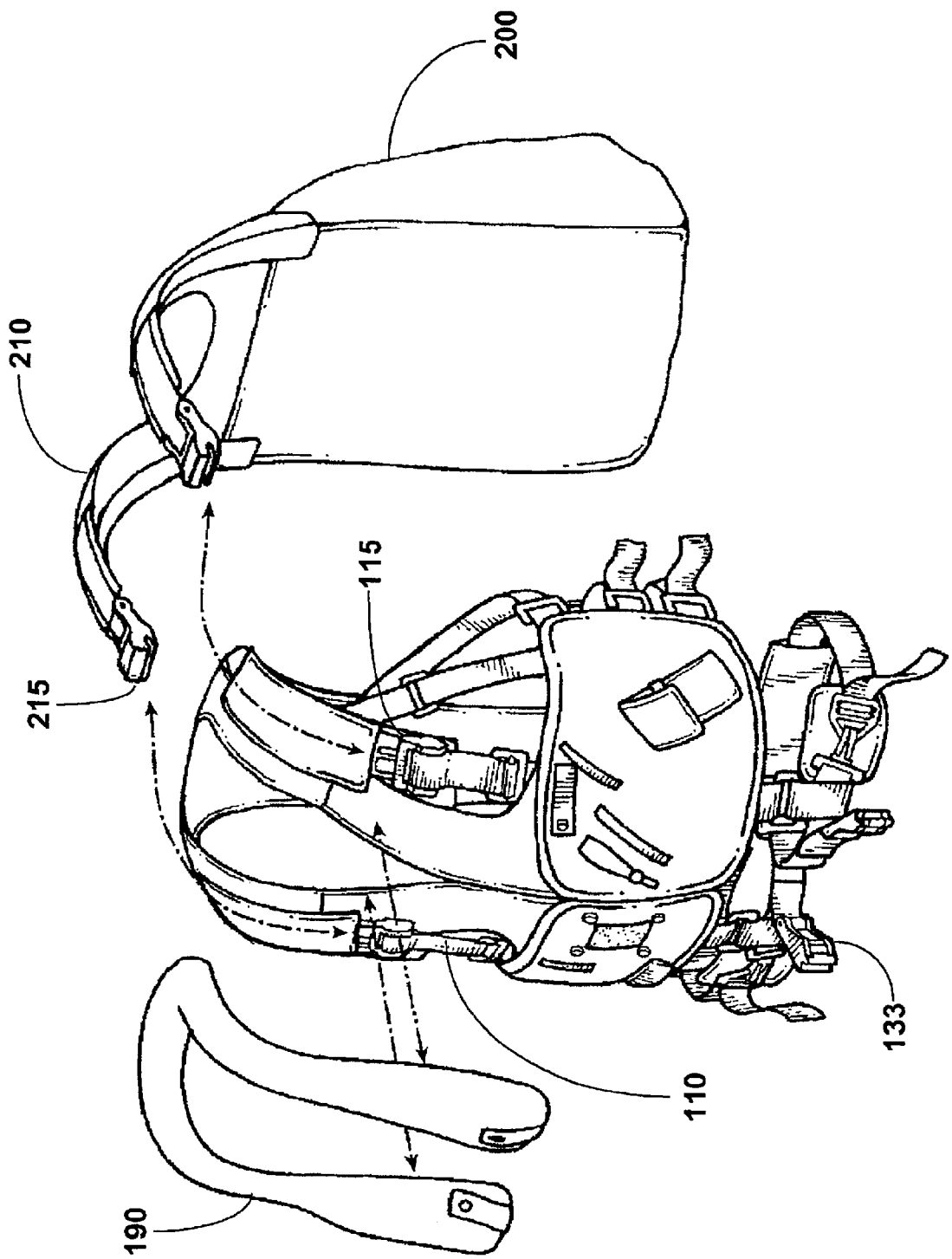
FIG. 3 is an exploded view of an exemplary embodiment of an integrated parachute harness ensemble in accordance with the present invention.

FIGS. 1 through 3 illustrate an integrated parachute harness ensemble in accordance with an exemplary embodiment of the present invention. Referring to FIG. 1, the integrated parachute harness system 100 of this exemplary embodiment is an ensemble that includes multiple harness restraints that secure a wearer in multiple angles, thereby providing multiple points of resistance. Each harness restraint may be used by itself, or in conjunction with one or more parallel restraints, thereby increasing its effectiveness in securing the wearer. In the exemplary embodiments shown, two parallel restraints are shown for each angle for sake of simplicity. However, two or more such parallel restraints may be used.

In the exemplary embodiment shown in FIGS. 1–3, a "three point" restraint system is shown having a plurality of restraints that secure a wearer in three geometric patterns with respect to a wearer who is standing vertical. These geometric patterns include, but are not limited to, vertical, horizontal, and diagonal. As defined herein and throughout this disclosure, a "restraint" is a device that fits relatively tightly against the wearer's body. Such restraints should have enough integrity to secure the weight of the wearer such as, for example, the wearer should be able to be supported by the restraint. Examples of restraints include, but are not limited to, straps, ropes, strips, or other similar material connectors.

As shown in the exemplary embodiments in the figures, a three-point restraint system is presented with respect to the harness system 100 for sake of simplicity. However, more than three points of restraints may be constructed on the harness system 100 such that a wearer is secured by more than three geometric patterns of restraints. However, increasing the number of restraint points would increase time required to don and doff the harness system 100, because of the increase in number of connector devices involved. A more detailed description of these multi-point security restraints of the harness system 100 will be made below.

A set of restraints on the harness system includes parachute harness 110, which is shown in FIG. 1 in a vertical position with respect to a wearer who is standing erect. The parachute harness 110 may be further connected to a larger spanning webbing 111 that functions to distribute the resistance across a user's body. Typically, two or more parachute harnesses 110 are needed to secure a parachute 200 to the harness system 100, as shown in FIG. 3. The parachute 200 typically hangs over the back of a wearer and is supported thereon by parachute hanging straps 210 that are connected to the parachute harness 110 through parachute connector means, such as, for example, connectors 215 that mate and lock into receiving connector housing 115 located on the parachute harness 110, as shown in FIG. 3. The parachute harness 110 should be constructed of material that is strong and flexible enough to withstand the forces applied thereon during a fall without breaking. For example, the parachute harness 110 may be constructed of WEBBING NYLON, TYPE VII, COND. R MIL-W-27265 VII (1¾ inch wide).

The parachute harness 110 may incorporate adjusters 120 to allow a user to create a snug fit onto his or her body. Examples of such adjusters include, but are not limited to, ADAPTER, QUICK "V" FIT rings (MS70114-1), QUICK EJECTOR SNAPS (MS22017), parachute canopy quick releases, and the like. Furthermore, the webbing 110 may be sewn with a Class VII sewing machine using V cord thread. Upon assembly of the parachute harness 110, any hardware is first attached to the webbing 110. The webbing 110 is looped through the hardware and fastened with a confluent wrap and, preferably, is then sewn with a four-point stitch pattern.

The design of the parachute harness 110 preferably incorporates a split saddle design using leg straps 130 for the wearer's legs with means for making adjustments of the leg straps, such as, for example, adjustable quick fit V-rings 131 or similar devices. In this exemplary embodiment, ejector snaps 132 allow for quick release of the wearer's legs, while providing secure fastening. As will be appreciated by those skilled in the art, other suitable means may be used for fastening the leg straps 130, including but not limited to, buckles, snaps, VELCRO, clips, and the like.

Referring to FIGS. 1 and 2, another restraint on the harness system 100 is a diagonally-positioned webbing harness 140 that spans across the shoulders and the back, crisscrossing at a middle portion 145 of a wearer's back area. The webbing harness 140 may have adjustable adapters 141 allowing for relative positional adjustment of the webbing harness 140 to fit a particular user's back. The webbing harness 140 may be attached to webbing 111, which travels across the front of the shoulders running parallel down across the chest and then loops on both sides through harness and pack connector links 147. On both sides of the wearer, the webbing 111 then runs back up to a parachute harness quick fit adapter 149. This routing enables the upper part of the harness to be adjusted with two adjustable adapters 120 in the front.

An adjustable horizontally positioned torso harness 150 connects the other two harnesses, the parachute harness 110, and the webbing harness 140, making it difficult for the wearer to fall out of the harness assembly 100. The torso harness 150 further has adjusters 151 that allow for adjusting to the body of the wearer. Leg straps 130 hang down from the torso harness 150 and extend to the wearer's legs. The connector 133 and an adapter 131 join the leg straps 130. The connector 133 may be, for example, a quick-fit release snap or the like. The adapter 131 may be, for example, a "V" quick adapter, or the like. A cushioning device 134, which may be padding, that may be connected to the leg straps 130, prevents the hardware from harming the wearer or wearing through clothing. Loops 136 on the leg straps 130 help distribute the stresses from the leg strap 130 on around the wearer's legs.

The integrated parachute harness system 100 can accommodate a vest ensemble 50. An example of such a vest ensemble 50 is the Safety Equipment Inc. (SEI) low-profile survival vest described in U.S. Pat. No. 6,108,816, which is incorporated by reference herein in its entirety. FIG. 1 shows an exemplary embodiment of the integrated parachute harness system 100 including a suitable vest 50.

Referring to FIG. 1 and FIG. 2, the ensemble 100 can accommodate a survival vest 160 having a broad central strip 161 forming the stem of a "Y" covering the back of the wearer. The "Y" further has left 162 and right 163 front strips, forming the twin forks of the "Y", dividing from the stem 161 of the "Y" at the back of the neck and running over the shoulders and down along each of the front shoulder/armpit areas of the wearer. The tips of each fork of the "Y" expand to form twin large pockets 170, which may cover at least a portion of the front of the chest, the abdomen, and, at least partially, the sides of the wearer. Twin large pockets 170 may be formed using a heavy-duty zipper, VELCRO, or other similar means, which is sewn around the periphery of each pocket area. Preferably, each pocket 170 is completely detachable.

An adjustable torso harness 150, as shown in FIG. 2, reinforces the vest 175 across the inside of the twin pockets 170 and along the edges of the forks of the "Y" of the vest 175, from the base of the pockets 170 to the point at which the forks join the stem of the "Y" at the back of the neck to form the collar of the vest, and along the outer edges of the stem of the "Y," which forms the back of the vest. Connected to the twin large pockets 170, a number of fasteners 171, 172, 173 attach various equipment pouches or devices to the survival vest 175 at a plurality of suitable locations. Such fasteners 171, 172, 173 may be, for example hook-and-loop fasteners, such as VELCRO, strips, patches, snaps, or similar devices. Preferably, the loop portion of the fasteners are sewn into the inner surface of, for example, each large pocket 170 (next to the wearer's body), and the hook portion of the fasteners is sewn into the back surface of the smaller survival equipment pouches.

Ideally, the vest 50 includes means for attaching the wearer to a lift mechanism, rescue line, aircraft, or other device for hoisting or stowing the assembly 100. Such attaching means include, for example, a plurality of loops 181, hooks, or the like. Of course, in another embodiment, the attaching means may include clips, quick release latches, or the like, for attaching the vest 175 (and assembly 100) to a pulley, aircraft, or other hoisting or stowing device.

Preferably, the present invention includes a flotation collar. FIGS. 1 and 3 illustrate an exemplary embodiment of an integrated parachute assembly 100 according to the present invention that further accommodates a flotation collar 190, typically used to maintain a wearer at a surface of a body of water. Such a flotation collar 190 may be, for example, the SEI low profile flotation collar described in U.S. Pat. No. 5,692,933, which is incorporated by reference herein in its entirety. The flotation collar 190 is preferably a safety and life-preserving flotation collar intended for use by aircraft and shipboard personnel in an emergency that leaves the personnel in water. The flotation collar 190 preferably has a fabric shell housing two automatically inflatable, independent, and symmetric flotation cells; two oral inflators and mechanical inflators mounted on the fabric shell; and a face shield stowed in the fabric shell. The flotation collar 190 may be worn with an auxiliary belt or with a survival vest.

In the preferred embodiment, the parachute harness system 100 is sewn and attached to the survival vest 175 by a series of loops 194 that hold the vest 175 securely to the parachute harness 110, but also allow for complete adjustment of the harness 110 to a wearer.

Alternatively, the vest 175 may be attached by other suitable attaching means, such as snaps, zippers, VELCRO, hooks, or other fasteners.

Preferably, the integrated parachute harness system 100 can support available quick release canopy hardware 149 and can be configured to support a back-mounted main parachute 200, as shown in FIG. 3. Furthermore, the integrated parachute harness system 100 further can accommodate a front-mounted reserve parachute (not shown). Referring to FIG. 3, the special mounting of the reserve hardware 133 on the ensemble 100 allows the reserve parachute to deploy with the G-loads absorbed along a long vertical axis of a crewmember's body. This helps to prevent injury to the lower back and further enabling the crewmember to control his or her body position during a reserve parachute's opening.

The invention is not limited to the exemplary embodiment described above and other embodiments are within the scope of the invention. In a second exemplary embodiment the leg straps 130 and the webbing 111 of the harness 110 create a joint that is on the wearer's hips, thereby absorbing stresses and distributing loads on the hips of the wearer. In this embodiment, padding 134 is located at the front of the wearer's legs to prevent the hardware from wearing on the legs of the user.

In another embodiment of the integrated parachute assemble, the ensemble includes several components integrated into one unit. First, an integrated harness is provided that is capable of acting as a lifting sling for search and rescue airlift capability; that includes at least one retention strap for in-cabin security; that includes a built-in repelling harness for search, rescue, and airlift capability; and that includes a hook-up for an emergency bail-out parachute, for example, a DURACHUTE. Additionally, the integrated parachute system 100 of a third embodiment includes a survival vest 175 that includes independent options including: soft body armor carrier vest; front and back hard body armor carriers; custom outer pocket designs for access of survival items; custom interchangeable outer pockets for specific missions such as CBR; and custom-fitted, interchangeable, mission-specific, survival item pockets.

As will be appreciated by those skilled in the art, the integrated parachute system of the present invention offers subsystem integration flexibility that may, for example, be used by the total spectrum of fixed wing and helicopter aircrews. The ensemble 100 of the present invention is smaller, lighter, and less bulky than, for example, the survival ensembles or components thereof currently supplied to members of the U.S. military. Wearing several separate overlapping components will tend to inhibit range of motion for the user and lead to wearer discomfort. The ensemble of the present invention is easily adjustable and configurable to accommodate all user body shapes and sizes required by U.S. military specifications. The individual wearer has many options available for determining how the items of survival equipment he or she wishes to carry should be arranged within the survival vest for optimal comfort and convenience.

As will also be appreciated by those skilled in the art, the integrated harness 110 serves as an integral part of the entire system. Rappelling, lifting, and retaining (RLR) straps are all integral within the "parachute harness". Additionally, as described above, the vest itself may include loops and connection points that allow for lifting a wearer or attaching the assembly to an apparatus such as a vehicle or hook. Thus, any of these straps are emergency means for the safety of aircrew and/or others being rescued. The inherent design capabilities on the RLR means that air-rescue personnel do not have to employ an additional sling or harness to lift the wearer to safety. Access to and engagement of these capabilities to a rescue hoist can be accomplished with, for example, the SEI low profile flotation collar, either uninflated or fully deployed.

The design of the open weave of the nylon mesh material allows air to pass through easily, so the vest is more comfortable in high temperature or high humidity environment. In one exemplary embodiment, the vest meets U.S. military Windblast protection requirements. For example, it can withstand a dynamic pressure of 9 psi, as experienced during the first 300 millisecond of ejection from an aircraft traveling 600 KEA. In comparison with the survival vests now used in the U.S. military, the wearer of the integrated parachute harness assembly of the present invention experiences far less "bounce" of the equipment while he or she is running.

While running with the assembly on, a wearer can doff unnecessary equipment.

As described above, in a preferred embodiment, the vest is designed to accommodate the SEI Low Profile Flotation Collar, so no additional flotation devices are required. The absence of flotation bladders, compressed gas canisters, or other flotation equipment or devices with the vest itself means that there is more room to carry survival gear. The vest can easily accommodate body-mounted chemical, biological, and radiological breathing and filtering components.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An integrated parachute assembly comprising:
a parachute harness assembly comprising: an adjustable parachute harness that includes two main adjustable straps that crisscross on a wearer's back; at least two adjustable leg straps; wherein the main straps attach to the at least two adjustable leg straps at main joints thereof;
an adjustable survival vest, wherein the vest is adjustably attached to the parachute harness; and
a flotation collar device, wherein the flotation collar is fixedly attached to the parachute harness assembly.

2. The integrated parachute assembly of claim 1, further comprising:
means for adjusting the main straps so to fit the user's back.

3. The integrated parachute assembly of claim 1, wherein the vest comprises a vest ensemble with at least two adjustable, removable pockets for holding supplies.

4. An integrated parachute assembly comprising:
a parachute harness assembly comprising: an adjustable parachute harness that includes at least two main adjustable straps that run down a wearer's back and connect to at least two adjustable leg straps;
a vest ensemble attached to said harness, wherein the vest ensemble includes at least two adjustable, removable pockets;
a flotation collar device that is removably attached to the parachute harness assembly; and
at least one parachute attached to the main straps at a front portion of the wearer.

5. The integrated parachute assembly of claim 4, further comprising:
torso straps that run perpendicular to the harness straps and connect thereto.

6. The integrated parachute assembly of claim 5, further comprising:
another set of straps that cross on a user's back and connect to the main straps.

7. An integrated parachute assembly comprising:
a parachute harness assembly comprising: an adjustable parachute harness that includes at least two main adjustable straps that cross on a wearer's back and means for attaching adjustable leg straps to the harness;
an adjustable vest ensemble with means for attaching a plurality of items to at least two adjustable pockets;
a flotation collar device, attached to the parachute harness assembly, wherein the harness assembly further includes means for adjusting the assembly to fit nearly any anthropomorphic profile; and
means for attaching the vest to the harness.

8. The integrated parachute assembly of claim 7, further comprising:

a means for attaching a parachute to the harness.

9. The integrated parachute assembly of claim 8, further comprising:

a parachute connected to the means for attaching a parachute.

10. The integrated parachute assembly of claim 7, further comprising:

means for attaching a parachute to the leg straps.

11. The integrated parachute assembly of claim 10, further comprising:

a parachute connected to the means for attaching a parachute.

12. An integrated harness device comprising:

a parachute harness assembly further comprising: an adjustable parachute harness that has first and second adjustable straps that travel from a common point at the upper middle of a wearer's back and run down and across a wearer's back to connect to two webbing joints, wherein the first and second straps also run up and over the shoulders of the wearer, down the wearer's chest, and connect to two adjustable leg straps, and further wherein the first and second adjustable straps include at least four buckles for adjusting the straps at the front and back of the wearer;

at least two adjustable leg straps, which include adjustable buckles and ejector snaps, wherein the leg straps are adjustable to fit the wearer and may be quickly released;

a vest ensemble attached to said harness, wherein the vest ensemble includes at least two adjustable, removable pockets;

a flotation collar device that is removably attached to the parachute harness assembly; and at least one parachute attached to the harness straps at front portion of the wearer, wherein the harness assembly includes connections for an auxiliary parachute.

13. An integrated parachute harness assembly comprising:

an adjustable parachute harness that includes two main adjustable straps that crisscross on a wearer's back; at least two adjustable leg straps; adjusters for adjusting the straps; wherein the main straps attach to the at least two adjustable leg straps at main joints thereof;

connector for accommodating an adjustable vest ensemble;

connector for accommodating a flotation collar device; and connector for accommodating at least one parachute attached to the harness straps at a front portion of the wearer.

14. The integrated parachute harness assembly of claim 13, further comprising:

a vest ensemble attached to said connector for accommodating an adjustable survival vest ensemble, wherein the vest ensemble includes at least two adjustable, removable pockets.

15. The integrated parachute harness assembly of claim 13, further comprising:

a flotation collar device attached to said connector for accommodating a flotation collar device, wherein said flotation collar device is removably attached to the parachute harness assembly.

16. The integrated parachute harness assembly of claim 13, further comprising:

at least one parachute connected to the connector for accommodating at least one parachute.

17. An integrated parachute harness assembly comprising:

an adjustable parachute harness that includes adjustable straps that crisscross on a wearer's back; vertical adjustable straps that can accommodate connectors attached to a parachute; and horizontal straps that partially extend across the wearer's torso, wherein the three straps function together to secure the wearer such that the wearer is removably secured to the parachute harness; and connector for accommodating at least one parachute attached to the vertical straps at a front portion of the wearer.

18. The integrated parachute harness assembly of claim 17, further comprising:

leg straps connected to the vertical straps to secure a wearer's legs.

19. The integrated parachute harness assembly of claim 18, further comprising:

another parachute connected to the leg straps.

20. The integrated parachute harness assembly of claim 17, further comprising:

at least one parachute connected to the connector for accommodating at least one parachute.

21. An integrated parachute harness assembly comprising:

a first set of restraints that wraps around a wearer's chest area in an upward manner;

a second set of restraints that is connected to the first set of restraints and spans across the wearer's back area, wherein the second set of restraints is adjustable; and a third set of restraints that is connected to the first set of restraints and spans across the wearer's waist area in a horizontal manner.

22. The integrated parachute harness assembly of claim 21, further comprising:

a set of parachute connectors located on the first set of restraints that connect to a parachute.

23. The integrated parachute harness assembly of claim 21, further comprising:

a set of leg harnesses connected to the first set of restraints and used for securing to the wearer's legs.

* * * * *